Sept. 16, 1947.    E. WILDHABER    2,427,641
METHOD OF PRODUCING CLUTCHES
Original Filed May 22, 1942    3 Sheets-Sheet 1

Inventor
ERNEST WILDHABER
By
Attorney

Sept. 16, 1947.   E. WILDHABER   2,427,641
METHOD OF PRODUCING CLUTCHES
Original Filed May 22, 1942    3 Sheets-Sheet 2

Inventor
ERNEST WILDHABER
By
B. E. Schlesinger
Attorney

Sept. 16, 1947.  E. WILDHABER  2,427,641
METHOD OF PRODUCING CLUTCHES
Original Filed May 22, 1942  3 Sheets-Sheet 3

Inventor
ERNEST WILDHABER
By
Attorney

Patented Sept. 16, 1947

2,427,641

UNITED STATES PATENT OFFICE 2,427,641

METHOD OF PRODUCING CLUTCHES

Ernest Wildhaber, Brighton, N. Y., assignor to Gleason Works, Rochester, N. Y., a corporation of New York Original application May 22, 1942, Serial No. 444,031, now Patent No. 2,384,582, dated September 11, 1945. Divided and this application January 31, 1944, Serial No. 520,463

17 Claims. (Cl. 90—9.4)

1

The present invention relates to toothed face clutches and to methods of producing the same. The present application is a division of my copending application Serial No. 444,031, filed May 22, 1942, now Patent No. 2,384,582, issued September 11, 1945, and is directed specifically to the novel method of this invention.

Toothed face clutch members are ordinarily made with radially disposed teeth. Such clutch members can be cut readily with reciprocating planing tools, but this process does not lend itself to mass-production requirements. To increase the speed of production, it has therefore been proposed to cut such clutch members with face-mill cutting tools and this has become an ever more generally used practice. A face-mill cutter cuts continuously except for the periods required for indexing the blank, whereas a reciprocating tool is idle on its return strokes as well as during the indexing periods; it cuts only on its strokes in one direction. The face-mill cutter used is ordinarily provided with inside and outside cutting edges, and one side of a tooth space is cut with the outside cutting edges of the cutter and the opposite side of the tooth space cut with the inside cutting edges of the cutter as the cutter rotates in engagement with the work. Such a cutter produces tooth spaces whose opposite sides are coaxial surfaces, of concave and convex lengthwise curvature, respectively. By properly positioning the cutter, however, tooth surfaces may be cut which are of zero spiral angle and the teeth may extend substantially radially of the clutch axis.

Where both members of a clutch have the opposite sides of their tooth spaces formed as coaxial surfaces in the manner described, however, it is necessary to cut the tooth spaces with taper in depth from end to end, and the taper in depth of the tooth spaces has to be increased over standard proportions of tapering depth teeth in order to obtain the necessary contact between the clutch members. The tooth spaces have to be cut extra deep at their outer ends. Thus, with this process, the structure of the clutch members has to be adapted to the process of cutting.

When the two members of a clutch are cut in the described manner, moreover, with face-mill cutters having straight side-cutting edges, mating tooth surfaces contact with a so-called "bias bearing," that is, with a bearing which extends diagonally of the teeth from one end to the other. This is a detriment. Of course, the formation of "bias bearing" can be avoided for using face-

2 mill cutters of the spherical type, but they are more difficult to make than a simple, straight-sided-blade cutter.

Another difficulty that arises in connection with releasable-type toothed face clutches is the provision of suitable chamfer on the teeth. The teeth have to be chamfered to facilitate engagement while in motion. The chamfered portions of the teeth should be so formed that there will be no concentration of the load at one end of the teeth, even when only the chamfered parts are in engagement.

A primary object of the present invention is to provide a process for cutting the tooth surfaces of toothed face clutch members with face-mill cutters, which will be just as fast as the known process above described, but which will avoid the drawback of the known process as regards excessive taper in height of the tooth spaces.

Another object of the invention is to provide a method for cutting toothed face clutch members with face-mill cutters having straight side-cutting edges which will avoid "bias bearing" condition.

Another object of the invention is to provide a process which will permit of cutting toothed face clutch members with face-mill cutters in such way that the teeth and tooth spaces of the clutch members may be of uniform height from end to end.

A further object of the invention is to provide a method which may be used either in the cutting or in the chamfering of the sides of the teeth, and which will permit of cutting or chamfering two side surfaces of a toothed face clutch member simultaneously.

Another object of the invention is to provide a method for chamfering the tops of the teeth of a releasable type toothed face clutch so that even when only the chamfered portions of the teeth of a pair of clutch members are in contact, the contact will not be concentrated at an end of the teeth.

Other objects of the invention will be apparent hereinafter from the specification and from the recital of the appended claims.

In the method of the present invention, a complete departure from previous practice is made, both in the cutting of the sides of the teeth and in the chamfering thereof. A face-mill cutter of large diameter is used and the cutter is so positioned that it will cut at two spaced points on its periphery simultaneously to cut or chamfer simultaneously opposite side surfaces of two spaced teeth of the blank. Heretofore face-mill cutters have been employed, at most, to cut simultaneously opposite sides of a single tooth space of a blank.

In the cutting of the side surfaces of the teeth, by the method of the present invention, the cutter is preferably so positioned that its axis is parallel to the clutch axis, and teeth of uniform depth from end to end may be cut. In the chamfering of the teeth, the cutter is positioned with its axis inclined to the clutch axis so as to cut chamfered surfaces which approximate helicoidal surfaces of varying lead. When both members of a face clutch have such chamfered surfaces, the clutch will carry properly the transmitted load, even when only the chamfered portions of the teeth are in engagement.

In the cutting of the side tooth surfaces of the two members of a clutch, the preferable method is to cut one member with a cutter whose finish-cutting edges are all outside cutting edges and the other member with a cutter whose finish-cutting edges are all inside cutting edges. With the first cutter, opposite side tooth surfaces will be cut simultaneously on spaced teeth of the blank which are longitudinally concave. With the second cutter, opposite side tooth surfaces will be cut simultaneously on spaced teeth of the blank which are longitudinally convex. Thus one clutch member will have teeth whose opposite sides are longitudinally convex, and the other clutch member will have teeth whose opposite sides are longitudinally concave.

By using a cutter for cutting one clutch member whose outside cutting diameter at mean cutting depth is equal to the inside cutting diameter of the cutter, which is used for cutting the other clutch member, the two clutch members will have full length tooth contact when in engagement. Ordinarily, however, it is preferred to have the clutch members engage with less than full length tooth contact. This can be accomplished by making the inside cutting diameter of the cutter, which cuts one of the clutch members, smaller than the outside cutting diameter of the cutter which cuts the teeth of the other clutch member. The mating clutch teeth then will have less than full length contact, and may have their tooth bearing or contact localized at the longitudinal center of the teeth and disappearing at the tooth ends. Thus the clutch members may be rendered insensitive to slight errors in cutting and to hardening distortions and be able to carry properly the transmitted loads without the loads being unduly concentrated at the ends of the clutch teeth.

Localization of tooth bearing can be achieved, also, by a modification of the invention in which both members of a clutch are cut with cutters having all inside finish cutting edges. Both members have, then, opposite side tooth surfaces which are longitudinally convex, and the mating tooth surfaces of the two members will engage, therefore, with less than full length tooth contact.

In all of the described embodiments of the invention, the clutch members will have side tooth surfaces which are longitudinally curved. The tooth sides have, however, a radial direction at mean points in their lengths, and to all intents and purposes, therefore, the clutch members themselves have substantially radial teeth.

The teeth of the members of a fixed clutch can be rounded off at top and bottom simultaneously with the cutting of the sides of the teeth, because the teeth of a clutch member produced by the method of this invention are of constant depth from end to end. The top rounding edges and the bottom rounding edges can therefore follow parallel paths as the blades of the cutter travel from end to end of a tooth space in the cutting of the sides of the tooth space.

The teeth of releasable clutches are, however, differently chamfered. In chamfering, a face-mill cutter with concave cutting edges is employed. This affects the cutter diameter to be used. The cutter, as already stated, is tilted with reference to the work axis in chamfering so that the teeth surface cut by the chamfering tool with approximate a helicoidal surface of varying lead, and the mean pressure angle of the finish-cutting edges of the chamfering cutter are selected in accordance with the amount of this tilt.

It is to be noted that in its chamfering phase, at least, the invention is not limited to use in the production of clutch members having longitudinally curved side tooth surfaces. The invention may be employed, also, for instance, in the chamfering of clutch members having radially disposed teeth with longitudinally straight tooth sides.

Several different embodiments of the invention are illustrated in the accompanying drawings, in which.

Figure 16:
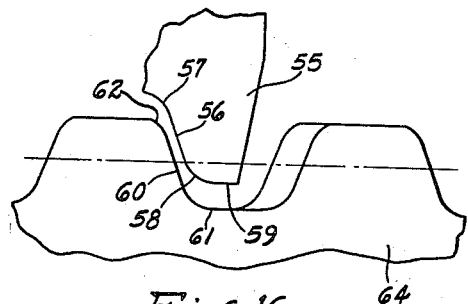
Figure 17:
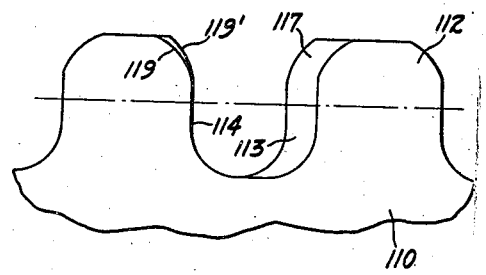

Fig. 16 is a fragmentary elevational view, illustrating diagrammatically how the tops and bottoms of a tooth of a member of a fixed clutch may be rounded simultaneously with the cutting of the side of the tooth when the clutch member is constructed according to the present invention; and Fig. 17 is a fragmentary elevational view of a releasable clutch member made according to this invention, and illustrating particularly the character of the chamfered portions of the tooth surfaces of this clutch member.

In Figs. 1 to 6 inclusive, the two members of a fixed face clutch made according to this invention are designated at 20 and 21, respectively. The member 20 has teeth 22 whose opposite sides 23 and 24 are longitudinally concave. The member 21 has teeth 25 whose opposite sides 26 and 27 are longitudinally convex. In one embodiment of the invention, the radius of lengthwise curvature of the concave sides of the teeth of one clutch member 20 is equal to the radius of lengthwise curvature of the mating convex sides of the teeth of other clutch member 21, and the teeth of the two clutch members, when in engagement, have therefore full length contact. This is the condition illustrated in Fig. 1. The common axis of the two clutch members is here denoted at 28.

For cutting the sides of the teeth of the clutch member 20, a face-mill cutter 30 is employed which has outside finish cutting edges 31. Instead of tilting the cutter, as would be conventional practice, so as to avoid having it cut at more than one part of the tooth zone of the work, the cutter is deliberately positioned to cut the opposite sides 23 and 24 of two spaced teeth of the clutch member simultaneously. Thus, it is positioned with its axis 32 parallel to the axis 28 of the work and in the embodiment illustrated in Fig. 3, its outside cutting diameter is sufficiently large for the cutter to finish simultaneously one side 23a of a tooth 22a and the opposite side 24b of a tooth 22b which is spaced a distance of five pitches from the tooth 22a.

Cutting is effected by rotating the cutter in engagement with the work while simultaneously effecting relative depthwise feed movement between the cutter and work until the tooth surfaces have been cut to full depth. After the cutting of one pair of tooth surfaces, the cutter is withdrawn from engagement with the work and the work is indexed through one pitch. Then the cutter is fed back into the work and another pair of tooth surfaces are finish-cut as before. The pressure angle or inclination of the outside cutting edges 31 of the cutter will correspond to the pressure angle or inclination of the sides of the teeth to be cut.

The mating member 21 of the clutch may have its tooth sides finish-cut with a face-mill cutter 35 which has inside finish-cutting edges 36. This cutter is positioned with its axis 37 parallel to the axis 28 of the clutch member and the diameter of this cutter is again such that it will finish-cut simultaneously opposite side surfaces of two spaced teeth of the clutch member. Thus, in the position shown in Fig. 5, the inside cutting edges of the cutter 35 cut simultaneously one side 27a of a tooth 25a and the opposite side 26b of a tooth 25b of the clutch member.

In the cutting of the clutch member 21, the cutter is rotated on its axis 37 and simultaneously fed relative to the work into depth until two tooth surfaces of the work have been finish cut for their full height. Then the cutter is withdrawn from engagement with the work, and the work is indexed. Then the cutter is fed back into the work and the cycle begins anew. The pressure angle or inclination of the inside finish-cutting edges of the cutter at 35 is equal to the pressure angle or inclination of the sides of the teeth of the clutch member at any point 38 in the common pitch surface 33, that is, the pressure angle or inclination of the inside cutting edges 36 of the cutter 35 is equal to the pressure angle or inclination of the outside cutting edges 31 of the cutter 30.

It will be noted that the finish cutting edges of the two cutters 30 and 35 are straight and of positive pressure angle. Nevertheless, there is no difficulty with reference to "bias bearing" because the teeth of the two clutch members are cut to be of constant depth from end to end. Thus relatively simple types of cutters may be employed.

Figure 8:
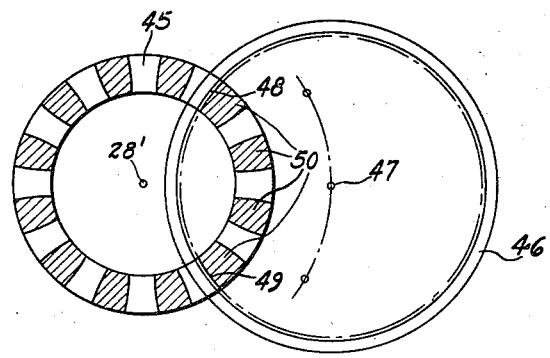
Fig. 8 is a view similar to Fig. 5, but illustrating diagrammatically how one member of the clutch may have its tooth surfaces cut to have a slightly different radius of lengthwise tooth curvature from the engaging tooth surfaces of the mating clutch member, so that the two clutch members may engage with a localized tooth bearing.

The two clutch members 20 and 21 will engage with full lengthwise tooth contact because the outside cutting edges 31 of the cutter 30 and the inside cutting edges 36 of the cutter 35 constitute complementary cutting surfaces which match each other and which have the same radii at points 34 and 38, respectively, in the pitch plane 33. Where it is desired that the mating tooth surfaces of the clutch members mesh with localized tooth contact instead of full length contact, one member of the pair may be cut with tooth surfaces having a different radius of lengthwise curvature from the tooth surfaces of the mating member of the pair. Thus the clutch member, which is to mesh with the clutch member 20, may be provided with teeth whose side surfaces have different lengthwise curvature, as has the clutch member 45 shown in Fig. 8.

Figure 5:
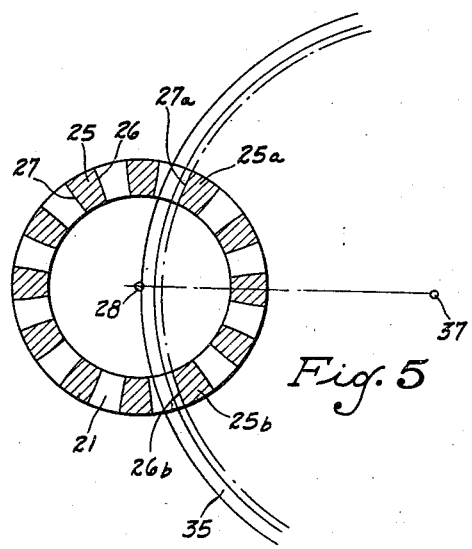
Figs. 5 and 6 are views, corresponding to Figs. 3 and 4, respectively, and illustrating diagrammatically one method of cutting a mating clutch member.
Figure 4:
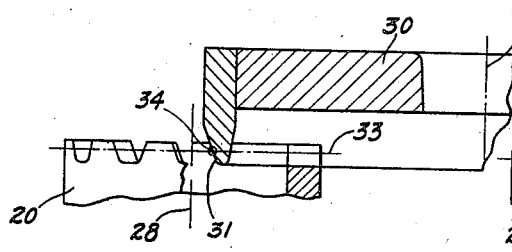
Fig. 4 is a part elevational, part sectional view taken at right angles to that of Fig. 3, further illustrating diagrammatically the method of cutting this clutch member.
Figure 6:
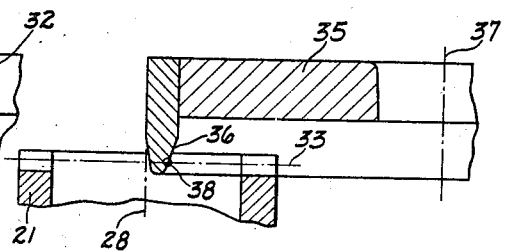

The clutch member 45 has its tooth surfaces finish-cut by a face-mill cutter 46 whose inside cutting diameter is considerably smaller than the inside cutting diameter of the cutter 35 of Figs. 5 and 6. The cutter 46 cuts opposite sides 48 and 49 of teeth 50 which are spaced three pitches apart, while the cutter 35 cuts opposite sides, such as 26b and 27a, of teeth 25 which are spaced four pitches apart. The cutter 46 has its axis 47 parallel to the axis 28' of the clutch member in the cutting operation, and the teeth of the clutch member 45 are cut, as before, by rotating the cutter 46 on its axis 47 while effecting a relative depthwise feed movement between the cutter and the work until the tooth surfaces have been cut to their full height. Then the cutter is withdrawn from engagement with the blank, and the blank indexed.

Figure 1:
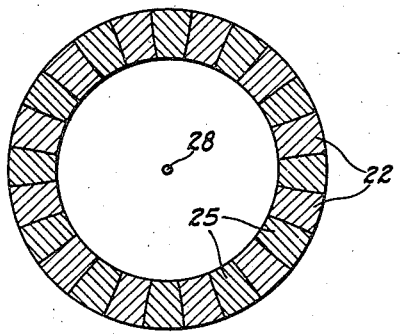
Fig. 1 is a sectional view showing a pair of toothed face clutch members made according to this invention in engagement, the section being taken in a mean plane, hereinafter referred to as the pitch plane, which is perpendicular to the clutch axis.
Figure 2:
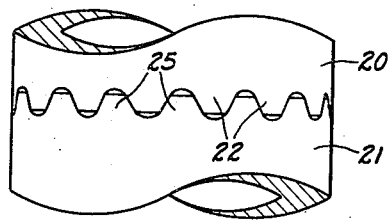
Fig. 2 is a fragmentary elevational view of the engaging clutch members.
Figure 3:
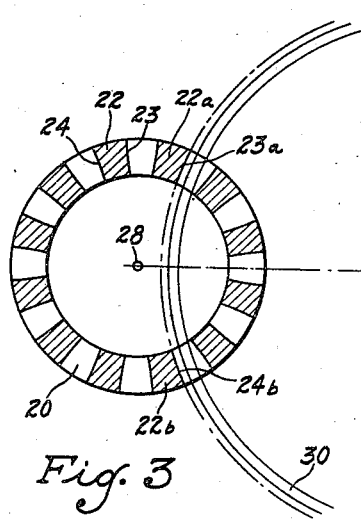
Fig. 3 is a diagrammatic view, showing one of the clutch members in section in the pitch plane, and illustrating the method of cutting this clutch member.
Figure 9:
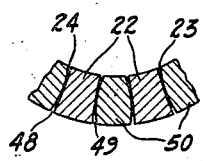
Fig. 9 is a fragmentary sectional view in the pitch plane showing in engagement two mating clutch members which have been made according to the present invention to engage with localized tooth contact.

Fig. 9 is a view similar to Fig. 1 showing fragmentarily how the teeth 22 of the clutch member 20 engage with the teeth 50 of the clutch member 45 when the two clutch members are in engagement. As will be seen, the opposite sides 23 and 24 of the teeth 22 of the clutch member 20 contact with the mating opposite sides 48 and 49, respectively, of the teeth 50 of the clutch member 45 with less than full length contact. By suitably positioning the cutter 46, the contact between the mating tooth surfaces of the two clutch members can be concentrated midway the length of their teeth so that the clutch members may accommodate themselves to slight errors in cutting and carry properly the transmitted loads without danger of these loads being unduly concentrated at the ends of the teeth.

Localization of tooth bearing can also be obtained by making the sides of the teeth of both clutch members longitudinally convex. Thus the teeth of two clutch members, like the clutch member 21 of Fig. 5, would engage with one another with a localized tooth contact. This construction may be employed especially where the diameters of the clutches are quite small.

Many advantages result from the cutting of the clutch members with teeth of constant depth from end to end, additional to those already indicated. Thus, as illustrated in Fig. 16, it is possible to cut the sides and round off the tops and bottoms of the teeth of such clutch members simultaneously. To do this, a face-mill cutter may be employed whose blades 55 have finish-cutting edges 56 which are rounded at the base of the blades, as indicated at 57, and which are also rounded off, as indicated at 58, where they join the tip cutting edges 59 of the blades. In the instance shown, the finish-cutting edge 56 of the blade is straight and inclined to the axis of the cutter for the greater part of its height, that is, of positive pressure angle.

When this cutter is rotated in engagement with a clutch blank 64 and simultaneously fed relatively in depth, it will cut tooth surfaces on the blank which are of straight profile and positive pressure angle for the greater portion of their heights, as indicated at 60, and which have well-rounded tooth space bottoms as denoted at 61 and rounds at their tops as indicated at 62.

Figure 7:
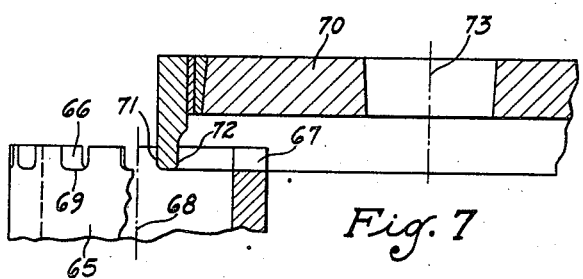
Fig. 7 is a diagrammatic view, similar to Figs. 4 and 6, illustrating the cutting of a somewhat modified form of clutch according to this invention.

The method of the present invention is not limited to production of clutch members having side tooth surfaces of positive pressure angle. Thus, as illustrated in Fig. 7, it may be employed also in the production of clutch members whose side tooth surfaces 66 and 67 are parallel to the clutch axis 68. Here a face-mill cutter 70 is employed that has outside cutting edges 71 or inside cutting edges 72 that are parallel to the cutter axis 73; the cutter is positioned so that its axis 73 is parallel to the clutch axis 68; and the tooth surfaces of the clutch member are produced by rotating the cutter on its axis while effecting relative depthwise feed movement between the cutter and work until the tooth surfaces of the work have been cut for their full height. By suitably rounding the blades of the cutter as illustrated in Fig. 7, rounded tooth space bottoms 69 may be formed on the work. The cutting edges of the cutter may also be formed, if desired, in a manner similar to that shown in Fig. 16, to round off the sides of the clutch teeth at their juncture with the tops of the teeth.

Clutch members, such as shown in Figs. 1 to 6 inclusive and 16, are intended primarily for use in fixed clutches where the two clutch members are rigidly bolted together in use. For releasable clutches, which are intended to be repeatedly engaged and disengaged, the side surfaces of the teeth may be cut in the manner described, but it is desirable to chamfer the teeth in such way that the teeth will carry the required loads even when the chamfered portions only of the teeth are in engagement and not have these loads concentrated at one end of the teeth. The desired type of chamfer may be produced by application of the cutting method of this invention to the production of chamfered tooth surfaces which approximate helicoidal surfaces of varying lead.

Figure 10:
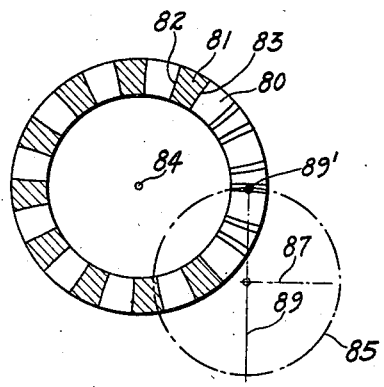
Figs. 10 and 11 are views at right angles to one another, illustrating diagrammatically the basic principles underlying the application of the present invention to the chamfering of the tops of the teeth of clutch members.
Figure 11:
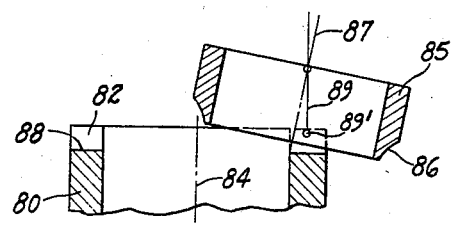

The principles of the chamfering operation are illustrated diagrammatically in Figs. 10 and 11. 80 denotes the clutch member whose teeth 81 are to be chamfered. The teeth of this particular clutch member have opposite side surfaces 82 and 83 which are longitudinally concave, but it will be understood that the invention applies equally to the chamfering of the teeth of clutch members whose opposite side tooth surfaces are longitudinally convex.

For the chamfering operation, a face-mill cutter 85 may be employed which has outside cutting edges 86 that are of concave profile shape. This cutter is tilted with reference to the work so that its axis 87 is inclined to the root plane 88 of the work and the cutter is revolved in engagement with the work. In the instance shown, the cutter is tilted in a direction lengthwise of the engaged clutch teeth only so that only one side surface of the clutch teeth is chamfered at a time. The cutter axis 87 is inclined to a normal 89 at a point 89' in the chamfered portion of the clutch member. Due to the inclination of cutter axis and the concave cutting profile 86, a lengthwise curve of larger radius will be cut on the chamfered portions of the teeth than the radius of the chamfering cutter. It is for this reason that the diameter of the chamfering cutter is made smaller than the diameter of the cutter which cuts the longitudinally concave sides 82 and 83 of the teeth. Due to the tilt of the chamfering cutter, also, the inclination of the chamfered surface will vary along the length of the clutch teeth. Thus a chamfered surface will be produced on each tooth which will approximate, as desired, a helicoidal surface of varying lead, having its pressure angle increasing with increasing distance from the clutch axis.

Figure 12:
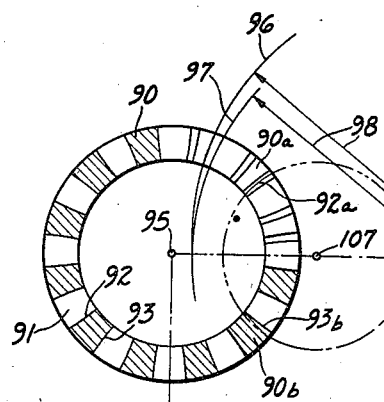
Figs. 12 and 13 are similar views, illustrating how opposite sides of spaced teeth of one member of a clutch may be chamfered according to the present invention.

The principle on which the chamfering operation depends is further illustrated diagrammatically in Fig. 12. Here 90 denotes the teeth of a clutch member 91 whose opposite side tooth surfaces 92 and 93 are of longitudinally concave shape and approximately zero pressure angle. As previously stated, the chamfered surface, which it is desired to produce on each tooth, is a helicoidal surface of varying lead. This is a surface such as might be produced by a line, preferably a circular arc, which is moved about the clutch axis 95 and simultaneously fed in the direction of the clutch axis at a varying rate. The intersection of such a helicoidal surface with any plane perpendicular to the clutch axis will be a circular arc. Thus, the intersection of the chamfered surface of a tooth with a plane containing the tops of the clutch teeth and perpendicular to the clutch axis might be a circular arc such as denoted at 96 in Fig. 12, while the intersection of the chamfered portion of a tooth with a plane perpendicular to the clutch axis but somewhat lower down on the chamfered surface might be a circular arc such as denoted at 97. The two circular arcs 96 and 97 have the same radii of curvature 98 but their centers of curvature 99 and 100, respectively, are displaced from one another about the axis 95 of the clutch and in the direction of this axis 95.

Such a helicoidal surface of varying lead can be approximated very closely, as already stated, by a surface of revolution of circular arcuate profile shape. This is the kind of surface produced by a rotating face-mill cutter when the cutter has cutting edges of circular arcuate profile shape and the axis of the cutter is tilted with reference to the clutch member to cut further down on the tooth profiles at the outer ends of the clutch teeth than at the inner ends thereof.

Figs. 10 and 11 are intended only to illustrate the principle underlying the formation of chamfered surfaces by the method of the present invention. In actual practice, the cutter employed for chamfering is so positioned and tilted that it chamfers simultaneously opposite sides of spaced teeth of the work. This is illustrated in Figs. 12 to 15 inclusive for both clutch members having longitudinally concave tooth surfaces and clutch members having longitudinally convex tooth surfaces.

Figure 13:
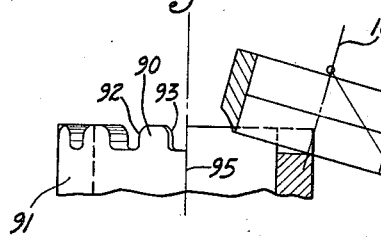

Figs. 12 and 13 show the chamfering of the teeth of a clutch member whose teeth 90 have longitudinally concave tooth sides 92 and 93. Here the chamfer is produced by a face-mill cutter 105 having outside cutting edges 106 of concave circular arcuate profile shape. This cutter is so tilted relative to the work that its axis 107 intersects the axis 95 of the clutch member instead of being offset therefrom as is the case with the cutter of Figs. 10 and 11. The outside cutting edges 106 of this cutter will then chamfer opposite side surfaces on spaced teeth of the work which will be surfaces of revolution whose profiles have varying inclination from end to end of the teeth. In Fig. 12 the cutter is shown in the position where it is chamfering the top portions of the sides 92a and 93b, respectively, of the teeth 90a and 90b, respectively, of the clutch. Chamfering is effected simply by rotating the cutter in engagement with the work while effecting such relative depthwise feed between cutter and work as is required to chamfer the tooth surfaces to the desired depth; and after one pair of tooth surfaces has been chamfered, the cutter is withdrawn from engagement with the work and the work is indexed.

Figure 14:
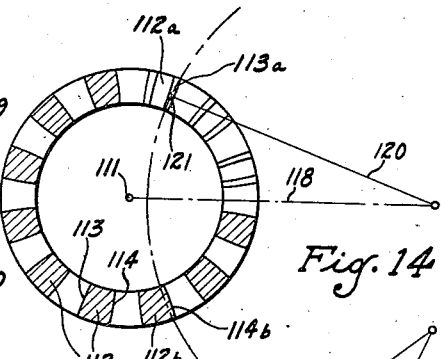
Figs. 14 and 15 are similar views, illustrating the preferred method of chamfering the teeth of the other member of the clutch.
Figure 15:
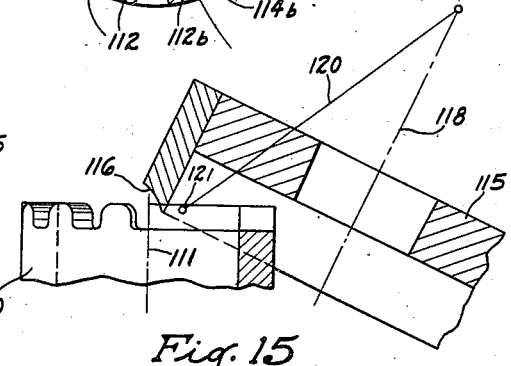

The convex side surfaces 113 and 114 of the teeth 112 of the clutch member 110, which is to engage with the clutch member 91, may be chamfered with the inside cutting edges of a cutter. It is preferred, however, particularly where the diameter of the cutter gets large, to use a cutter having outside cutting edges to chamfer the side surfaces even of teeth whose sides are longitudinally convex. This is illustrated in Figs. 14 and 15. Here the opposite side surfaces 113 and 114 of the teeth 112 of the clutch member 110 are chamfered by a face-mill cutter 115 having outside cutting edges 116 of circular arcuate profile shape and suitable pressure angle. This cutter is so tilted with reference to the work that it will chamfer simultaneously opposite sides of spaced teeth of the work. Its axis 118 is inclined to the axis 111 of the work but lies in the same plane as the axis of the work and intersects the axis of the work. Thus, as shown in Fig. 14, the cutter may chamfer simultaneously the opposite side 113a and 114b of the spaced teeth 112a and 112b, respectively, of the work. The chamfering is effected by rotating the cutter on its axis 118 in engagement with the work while the work is held stationary on its axis 111. After a pair of tooth surfaces have been chamfered, the cutter is withdrawn from engagement with the work and the work indexed. 120 denotes a normal at point 121 to the chamfered portion 113a of one side of the tooth 112a of the work.

While it is preferred to use chamfering cutters whose cutting edges are of circular arcuate profile shape, the invention is not restricted to the use of such cutters. The chamfering edges might be of any other suitable shape, as, for instance, involute curvature.

A portion of a clutch member 110 whose teeth 112 have chamfered portions produced according to the method of this invention, is shown on an enlarged scale in Fig. 17. The chamfered portions of the teeth are convex surfaces of revolution. It will be noted that the inclination of the chamfered portion 117 of each tooth surface increases with increasing radial distance from the clutch axis. Thus, the profile curve 119 of the chamfered surface at the outer end of a clutch tooth has a greater inclination to the tooth side 114 than the profile curve 119' at the inner end of the chamfered portion of the tooth.

In the embodiment shown in Fig. 17, the side-cutting edges of the chamfering cutter are so constructed that the chamfered portions of the teeth adjoin the side surfaces of the teeth smoothly without break. The juncture may be at an angle, however, but, if so, this is preferably kept as small as possible.

The method of the present invention is not restricted to the chamfering of clutch members having teeth with longitudinally curved sides. It may be used also, as will be obvious, in chamfering clutch members having radially disposed teeth and tooth sides. Chamfered surfaces in the form of helicoidal surfaces of varying lead are essential to such clutch members also, if concentration of the loads at one end of the teeth is to be avoided when the clutch members are moving into and out of engagement. Here the cutters employed for chamfering will have outside cutting edges like those illustrated in Figs. 12 to 15 inclusive.

While the invention has been described in connection with the use of face-mill cutters, it is to be understood that oscillatory tools might be employed instead. It is to be understood, also, that the term cutter is intended to include grinding wheels also and is so used throughout specification and claims.

It is further to be understood that while the invention has been described in connection with the use of cutters having all outside or all inside blades, this part of the description refers to finish-cutting only, and that for rough-cutting or for finish-cutting directly from the solid blank, a cutter might be employed having both inside and outside cutting edges to take out the stock more readily. In this event the point-width of the cutter would be less than the finished width of the tooth spaces so that only the side-cutting edges at one side of the cutter would finish-cut the desired tooth sides of the work.

While several different embodiments of the invention have been described, it will be understood that the invention is capable of further modification, and this application is intended to cover any adaptations, uses, or modifications of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting portions of the teeth of a toothed face clutch member which comprises moving a cutting tool in a longitudinally curved path across the face of the work so that the tool operates at two spaced points in the tooth zone of the work and cuts portions at opposite sides of two spaced teeth of the clutch member about a common center in its travel, and then rotating the work on its axis to index it, and alternating the cutting and the indexing operations until all of the teeth have been cut, the positions of the work and cutter axes relative to one another being uniform for the different cutting operations.

2. The method of cutting portions of the side surfaces of the teeth of a toothed face clutch member which comprises positioning a face-mill cutter, which has side-cutting edges, in engagement with the work so that its axis is parallel to but offset from the axis of the work, and rotating said cutter on its axis so that its side cutting edges operate simultaneously on opposite sides of two spaced teeth of the work, while effecting a relative depthwise feed movement between the cutter and work to cut the tooth surfaces of the work to their full height, then withdrawing the cutter from engagement with the work and rotating the work on its axis to index it, and alternating the feeding and indexing operations until the opposite sides of all of the teeth have been cut, the positions of the work and cutter axes relative to one another being uniform for the different cutting operations.

3. The method of chamfering the sides of the teeth of a toothed face clutch member which comprises moving a cutting tool in a longitudinally curved path across the face of the work about an axis inclined to the work axis and intersecting the work axis, to cut at two spaced points in the tooth zone of the work and chamfer opposite sides of spaced teeth of the work simultaneously, then rotating the work on its axis to index it, and alternating the cutting and the indexing operations until all of the tooth sides of the work have been chamfered, the positions of the work and cutter axes relative to one another being uniform for the different cutting operations.

4. The method of chamfering the sides of the teeth of a face clutch member which comprises employing a face-mill cutter, which has side-cutting edges of concave profile shape, positioning said cutter in engagement with the work so that its axis is inclined to the axis of the work and intersects said axis, and rotating the cutter in engagement with the work to chamfer opposite sides of spaced teeth of the work simultaneously, then indexing the work by rotating it on its axis, and alternating the chamfering and the indexing operations until all of the sides of the teeth have been chamfered, the positions of the work and cutter axes relative to one another being uniform for the different chamfering operations.

5. The method of producing a toothed face clutch member which comprises employing a face-mill cutter having cutting edges for cutting the sides of the teeth and cutting edges for rounding the teeth at the tops and bottoms thereof, positioning said cutter in engagement with the work so that its axis is offset from but parallel to the axis of the work, and rotating said cutter on its axis while effecting a relative feed movement between the cutter and work until the tooth surfaces have been cut to full height, periodically indexing the work by rotating it on its axis, and alternating the feeding and the indexing operations until all of the teeth have been cut, the positions of the work and cutter axes relative to one another being uniform for the different cutting operations.

6. The method of producing a toothed face clutch member which comprises employing a face-mill cutter that has cutting edges for cutting the sides of the teeth and cutting edges for rounding the teeth at the tops and bottoms thereof, positioning said cutter in engagement with the work so that the axis of the cutter and the work axis are located in the same plane but offset from one another, rotating said cutter on its axis while effecting a relative feed movement between the cutter and work until the tooth surfaces have been cut to full height, periodically indexing the work by rotating it on its axis, and alternating the feeding and the indexing operations until all of the teeth have been cut, the positions of the work and cutter axes relative to one another being uniform for the different cutting operations.

7. The method of chamfering the teeth of a toothed face clutch member which comprises positioning a face-mill cutter that has side cutting edges of concave profile shape so that the axis of the cutter is inclined to and intersects the axis of the work, rotating said cutter in engagement with the work, indexing the work periodically by rotating it on its axis, and alternating the chamfering and indexing operations until all of the teeth have been chamfered, the positions of the work and cutter axes relative to one another being uniform for the different chamfering operations.

8. The method of cutting a pair of toothed face clutch members which comprises cutting the sides of the teeth of one member of the pair with a face-mill cutter having all outside finish-cutting edges by positioning said cutter so that it will cut simultaneously at two spaced points in the tooth zone of the work, and rotating said cutter in engagement with the work to cut simultaneously longitudinally concave side tooth surfaces upon opposite sides of spaced teeth of the work, and cutting the sides of the teeth of the other member of the pair with a face-mill cutter having all inside finish cutting edges, by positioning said last named cutter so that it will operate simultaneously at two spaced points in the tooth zone of the work, and rotating said last-named cutter in engagement with the work to cut simultaneously longitudinally convex side tooth surfaces upon opposite sides of two spaced teeth of the work.

9. The method of cutting a pair of toothed face clutch members which comprises cutting one member of the pair with a face-mill cutter having all outside finish-cutting edges by positioning said cutter so that it will operate simultaneously at two spaced points in the tooth zone of the work, rotating said cutter in engagement with the work to cut simultaneously longitudinally concave side tooth surfaces upon opposite sides of two spaced teeth of the work, indexing the work periodically by rotating the work on its axis, and alternating the cutting and the indexing operations until all of the sides of the teeth have been cut, and cutting the other member of the pair with a cutter whose finish-cutting edges are all inside cutting edges, by positioning the latter cutter in engagement with the work so that it will operate simultaneously at two spaced points in the tooth zone of the work, rotating said cutter in engagement with the work to cut simultaneously longitudinally convex side tooth surfaces on opposite sides of two spaced teeth of the work, indexing the work periodically by rotating the work on its axis, and alternating the cutting and the indexing operations until all of the sides of the teeth of the second clutch member have been cut, the radial distance of the outside cutting edges of the first cutter from the axis of that cutter being greater than the radial distance of the inside cutting edges of the second cutter from the axis of the latter cutter.

10. The method of chamfering the teeth of a toothed face clutch member which comprises positioning a face-mill cutter, that has outside cutting edges of concave profile shape, so that the cutter will operate at two spaced points in the tooth zone of the work simultaneously, and so that the axis of the cutter is inclined to the axis of the work in such way as to cut deeper at the outer ends of the teeth than at the inner ends thereof, rotating said cutter in engagement with the work, indexing the work periodically by rotating it on its axis, and alternating the chamfering and the indexing operations until all of the teeth have been chamfered at both sides thereof.

11. The method of cutting portions of the teeth of a toothed face clutch member which comprises positioning a face-mill cutter, that has finish side-cutting edges at one side only, in engagement with the work so that it will operate in two different tooth spaces of the work simultaneously and its cutting surface will be tangent to a line radial of the work axis at a mean point lengthwise of a side of each tooth space, rotating the cutter in engagement with the work to finish-cut simultaneously opposite sides of spaced teeth of the work, indexing the work periodically by rotating it on its axis, and alternating the cutting and indexing operations until all of the teeth of the work have been cut, the positions of the work and cutter axes relative to one another being uniform for the different cutting operations.

12. The method of cutting portions of the teeth of a toothed face clutch member which comprises employing a face-mill cutter, all of whose blades have side-cutting edges disposed at the same side thereof, positioning said cutter in engagement with the work so that it will operate at two spaced points in the tooth zone of the work simultaneously, rotating the cutter in engagement with the work, indexing the work periodically by rotating it on its axis, and alternating the cutting and the indexing operations until all of the teeth of the work have been cut, the positions of the work and cutter axes relative to one another being uniform for the different cutting operations.

13. The method of cutting a toothed face clutch member which comprises employing a face-mill cutter having all inside cutting edges, positioning said cutter in engagement with the work, so that it will operate simultaneously in two different tooth spaces of the work and so that its cutting surface is tangent to a line radial of the work axis at a mean point lengthwise of a side of each tooth space, and rotating the cutter in engagement with the work to cut simultaneously longitudinally convex tooth surfaces on opposite sides of two spaced teeth of the work.

14. The method of cutting portions of the teeth of a toothed face clutch member which comprises positioning a face-mill cutter, that has all outside cutting edges of concave profile shape, so that the axis of the cutter is inclined to and intersects the axis of the work, and rotating the cutter in engagement with the work while maintaining the axis of the cutter in its position of intersection of and inclination to the work axis.

15. The method of chamfering the teeth of a toothed face clutch member which comprises employing a cutting tool which has side cutting edges of concave profile shape, positioning said tool in engagement with the work so that it will cut deeper at the outer ends of the teeth than at the inner ends thereof, and imparting cutting movement to the tool.

16. The method of chamfering a toothed face clutch member which has side tooth surfaces of a given radius of lengthwise curvature which comprises positioning a face-mill cutter, which is of smaller radius than the radius of curvature of the tooth sides, so that its axis is inclined to the work axis to cut deeper at the outer ends of the teeth than at the inner ends thereof, and rotating the last named cutter in engagement with the work, then withdrawing the cutter from engagement with the work and indexing the work, and repeating the operation until all of the teeth have been chamfered, the indexing being effected by rotation of the work, and the positions of the work and cutter axes relative to one another being uniform for the different chamfering operations.

17. The method of chamfering a toothed face clutch member which has side tooth surfaces of a given radius of lengthwise curvature which comprises employing a face-mill cutter, that has all outside cutting edges of concave profile shape and which is of smaller radius than the radius of curvature of the tooth sides, positioning said cutter so that it will cut simultaneously at two spaced points in the tooth zone of the work and so that its axis is inclined to and intersects the axis of the work so as to cut deeper at the outer ends of the teeth than at the inner ends thereof, rotating the last named cutter in engagement with the work, then withdrawing the cutter from engagement with the work and indexing the work, and repeating the cutting and indexing operations until all of the teeth have been chamfered, the indexing being effected by rotation of the work on its axis, and the positions of the work and cutter axes relative to one another being uniform for the different chamfering operations.

ERNEST WILDHABER.

REFERENCES CITED

The following references are of record in the file of this patent:

UNITED STATES PATENTS

| Number | Name | Date |
| --- | --- | --- |
| 148,884 | Hewes | Mar. 24, 1874 |
| 1,311,583 | Zetterlund | July 29, 1919 |
| 1,498,231 | Carter | June 17, 1924 |
| 1,985,409 | Hill | Dec. 25, 1934 |
| 2,035,434 | Loewus | Mar. 24, 1936 |
| 2,271,438 | Miller | Jan. 27, 1942 |
| 2,354,653 | Allen | Aug. 1, 1944 |